United States Patent [19]

Kurihara

[11] Patent Number: 4,981,126
[45] Date of Patent: Jan. 1, 1991

[54] IGNITION TIMING CONTROL SYSTEM

[75] Inventor: Masaru Kurihara, Mitaka, Japan

[73] Assignee: Fuji Jukogyo Kabushiki Kaisha, Tokyo, Japan

[21] Appl. No.: 467,615

[22] Filed: Jan. 19, 1990

[30] Foreign Application Priority Data

Jan. 20, 1989 [JP] Japan ................... 1-012858

[51] Int. Cl.$^5$ ........................................... F02M 51/00
[52] U.S. Cl. .................................................... 123/492
[58] Field of Search ............... 123/492, 493, 480, 486, 123/494, 485, 602, 625, 594, 609, 597

[56] References Cited

U.S. PATENT DOCUMENTS

| | | | |
|---|---|---|---|
| 4,469,082 | 9/1984 | Nishitoba et al. | 123/609 |
| 4,502,454 | 3/1985 | Hamai et al. | 123/597 |
| 4,884,548 | 12/1989 | Sugawa | 123/492 |

FOREIGN PATENT DOCUMENTS 59-201971 11/1984 Japan .

Primary Examiner—Raymond A. Nelli
Attorney, Agent, or Firm—Martin A. Farber

[57] ABSTRACT

A basic threshold value is calculated by averaging fluctuations of engine speed, and an acceleration threshold value which is higher than the basic threshold value is calculated. Surges existing in the fluctuation are compared with the basic threshold value and with the acceleration threshold value. The ignition timing of the engine is retarded by a predetermined initial retard angle when a first surge after beginning of acceleration of the engine is higher than the acceleration threshold value, and the ignition timing is retarded by retard angle which is smaller than the initial retard angle when each of second and subsequent surges is higher than the basic threshold value.

6 Claims, 6 Drawing Sheets

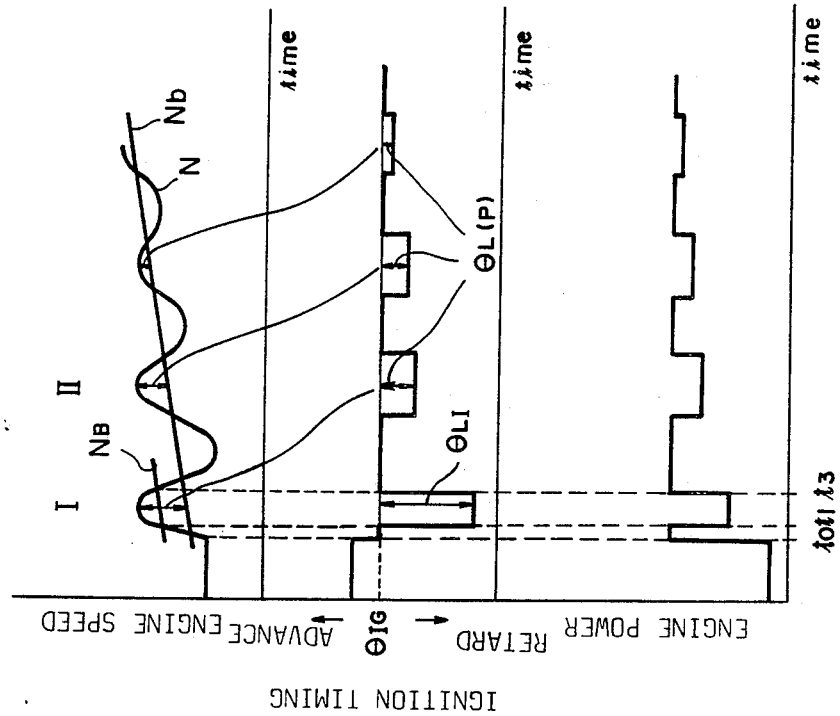

IGNITION TIMING CONTROL SYSTEM

BACKGROUND OF THE INVENTION

The present invention relates to an ignition timing control system for an automotive engine of a motor vehicle and more particularly to a system for decreasing the fluctuation of engine speed at acceleration.

Recently, the ignition timing of the automotive engine is electronically controlled by an electronic control system by using timing data derived from a table storing a plurality of data of ignition timings. When the vehicle is accelerated, quantity of intake air, quantity of fuel and the ignition timing largely and rapidly change so that at the beginning of the acceleration, the engine speed increases with fluctuating. As a result, some parts of the power train of the vehicle are twisted, thereby causing uncomfortable shock and vibration.

Japanese patent application Laid Open No. 59-201971discloses an ignition timing control system where the fluctuation of the engine speed is decreased by controlling the ignition timing. In the system, when the engine speed increases from a threshold value (an average speed of the engine speed), the ignition timing is retarded. To the contrary, when the engine speed decreases, the ignition timing is advanced.

However, in order to prevent a large increase hereinafter called surge, the ignition timing must be largely retarded or advanced, which causes knocking of engine and deterioration of combustion efficiency.

SUMMARY OF THE INVENTION

The object of the present invention is to provide an ignition timing control system where the fluctuation of the engine speed may be effectively decreased while maintaining the increase of the engine speed and acceleration of the engine at the start of the rapid acceleration.

According to the present invention, there is provided an ignition timing control system for an automotive engine of a motor vehicle having engine speed detector means for detecting the engine speed and a throttle position sensor for detecting an opening degree of a throttle valve of the engine.

The system comprises acceleration detector means for detecting beginning of acceleration of the engine and for producing an acceleration signal, basic threshold value calculator means for calculating a basic threshold value in accordance with the engine speed detected by the engine speed detector means, acceleration threshold value calculator means for calculating an acceleration threshold value which is higher than the basic threshold value, comparator means for comparing surges existing in fluctuation of the detected engine speed with the basic threshold value and the acceleration threshold value. The ignition timing of the engine is retarded by a predetermined initial retard angle when a first surge is higher than the acceleration threshold value, and the ignition timing is retarded by a secondary retard angle which is smaller than the initial retard angle, when each of second and subsequent surges is higher than the basic threshold value.

The other objects and features of this invention will become understood from the following description with reference to the accompanying drawings.

BRIEF DESCRIPTION OF DRAWINGS

FIGS. 4a to 4c are timecharts showing characteristics of engine speed, ignition timing and engine power at acceleration, respectively.

DETAILED DESCRIPTION OF THE PREFERRED EMBODIMENT

Figure 1:
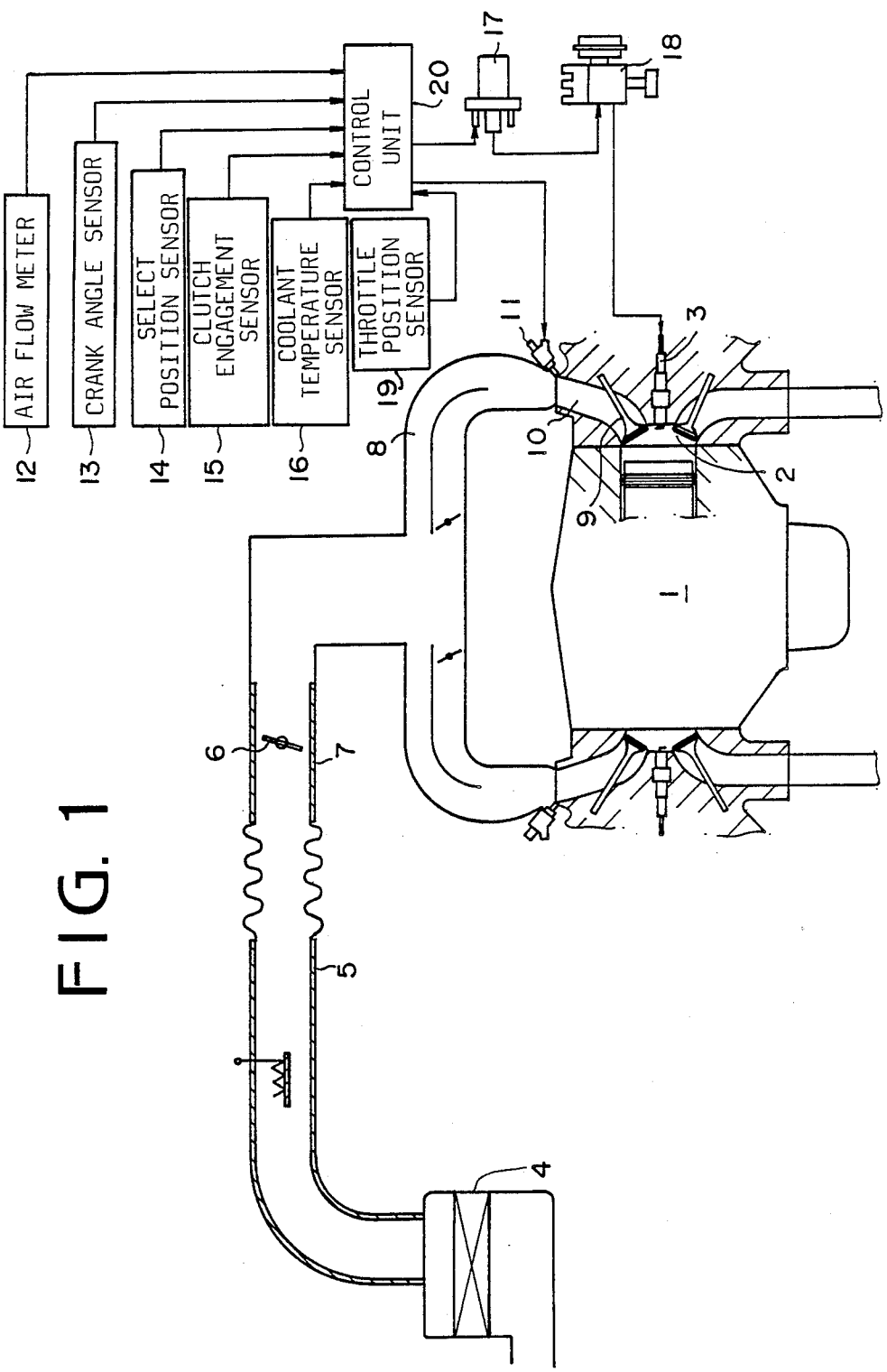
FIG. 1 is a schematic illustration of an electronic control system of an automotive engine.

Referring to FIG. 1, an engine 1 as a throttle valve 6 provided in a throttle body 7 communicated with an air cleaner 4 through an intake pipe 5. The throttle body 7 is communicated with an intake manifold 8 which is communicated with a combustion chamber 2 of each cylinder in the engine 1 through an intake port 10 and an intake valve 9. A spark plug 3 is located in each combustion chamber 2 and a fuel injector 11 is provided in the intake manifold 8 adjacent each intake port 10. The engine 1 is provided with an air flow meter 12 in the intake pipe 5 downstream of the air cleaner 4 for detecting the quantity of intake air, a crank angle sensor 13, a select position sensor 14, a clutch engagement sensor 15, a coolant temperature sensor 16 and a throttle position sensor 19. The output signals of the sensors 12 to 16 and 19 are applied to a control unit 20 which applies a fuel injection signal to the injector 11 of each cylinder and an ignition signal to the spark plug 3 of a corresponding cylinder through an ignition coil 17 and a distributor 18.

Figure 2:
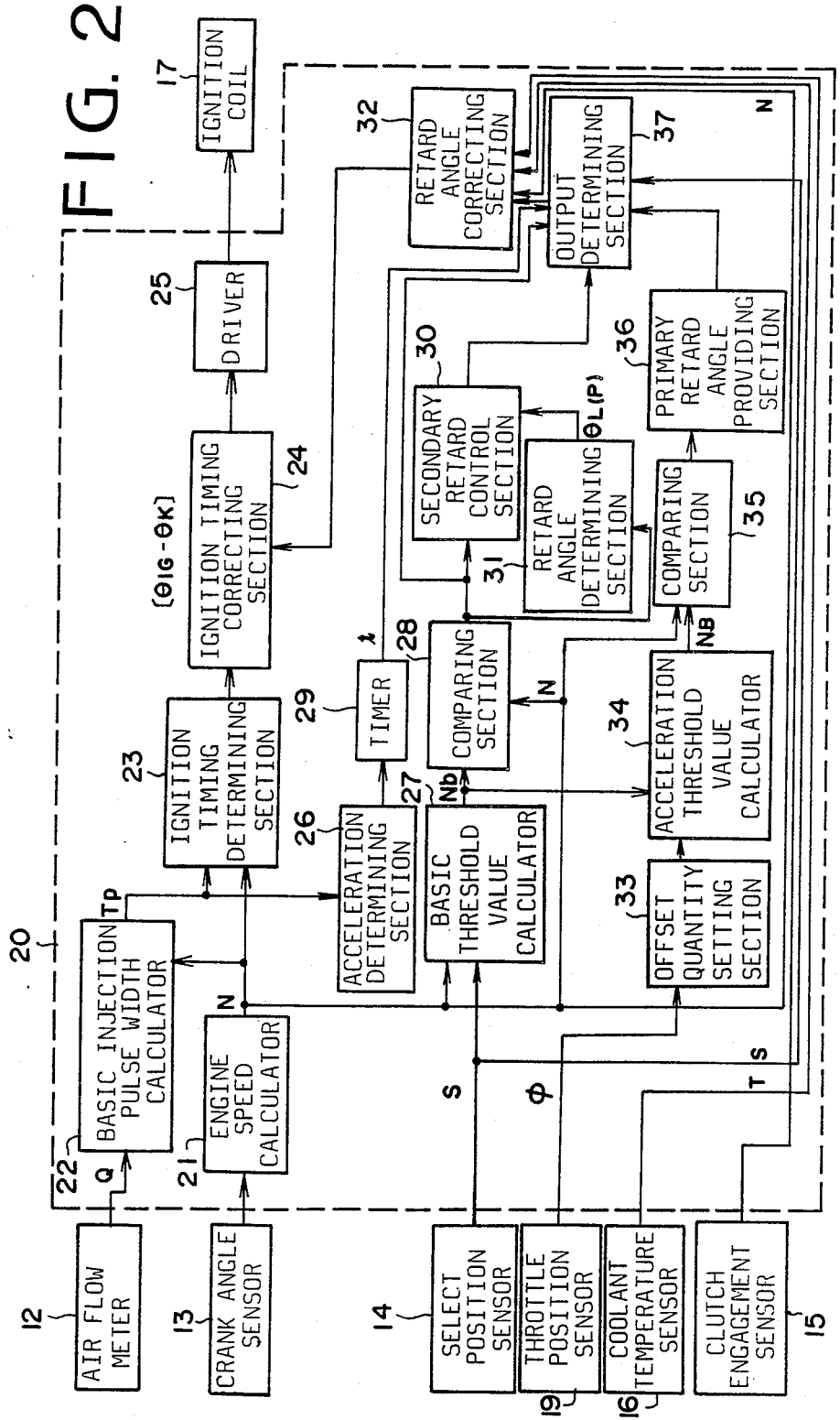
FIG. 2 is a block diagram showing a control system of the present invention.

Referring to FIG. 2 showing the control unit 20, the crank angle signal from the crank angle sensor 13 is fed to an engine speed calculator 21 to produce an engine speed N. The engine speed N and the intake air quantity Q from the air flow meter 12 are fed to a basic injection pulse width calculator 22 so as to calculate a basic injection pulse width Tp in dependency on the following equation.

$$Tp = K \times Q/N \text{ (K is a constant)}$$

The basic injection pulse width Tp and the engine speed N is fed to an ignition timing determining section 23 including an ignition timing table where optimum ignition timings $\theta IG$ are stored in accordance with various driving conditions. The optimum ignition timing $\theta IG$ derived from the table in accordance with the basic injection pulse width Tp and the engine speed N is fed to an ignition timing correcting section 24 so as to be corrected as will later be described. The output of the correcting section 24 is fed to a driver 25 which applies the ignition signal to the ignition coil 17 at the determined timing before the top dead center which is detected in dependency on the crank angle signal from the crank angle sensor 13.

A system for correcting the ignition timing at the acceleration of the vehicle is described hereinafter. The control unit 20 has an acceleration determining section 26 to which the basic injection pulse width Tp is applied. The acceleration determining section 26 determines that the engine is accelerating when a basic injection pulse width increasing speed dTp/dt is larger than a predetermined reference value. The output of the acceleration determining section 26 is applied to a timer 29 which sets a predetermined period t from the determination of the acceleration.

Figure 3A:
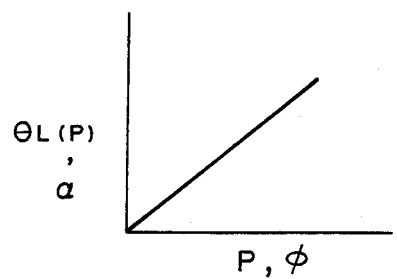
FIG. 3a is a graph showing relationships between a retard angle and peak engine speed and between quantity of offset and throttle valve opening degree.

The control unit 20 is further provided with a basic threshold value calculator 27 to which the engine speed N and the output of the select position sensor 14 are fed for providing a basic threshold value Nb in accordance with the engine speed N. More particularly, the fluctuation of the engine speed signal N is smoothed by a low-pass filter. The time constant of the filter is changed in accordance with the frequency of the fluctuation of the engine speed signal depending on each select position of a transmission, so that the average of the fluctuation is produced, which is used as the basic threshold value Nb (FIG. 4a). The threshold value Nb and the engine speed N are applied to a second comparing section 28 which calculates a difference P in accordance with the equation P=N - Nb. The comparing section 28 feeds a retard control signal to a secondary retard control section 30 when the difference P is larger than zero (when N >Nb). The difference P is fed to a retard angle determining section 31 to determine a peak value Pmax of each surge of the fluctuation by selecting the maximum difference. The section 31 has a table storing a plurality of retard angles $\theta L(P)$ which increase with an increase of the peak value Pmax as shown in FIG. 3a. In the retard angle determining section 31, a retard angle $\theta L(P)$ corresponding to the peak value Pmax is derived from the table at every surge and fed to the retard control section 30 and stored therein. Each derived retard angle $\theta L(P)$ is used at the next surge.

The retard control signal from the comparing section 28 is applied to the retard control section 30 so as to feed the derived retard angle $\theta L(P)$ to an output determining section 37 only when N is larger than Nb.

In order to determine an initial retard angle $\theta LI$ at a first surge of the engine speed after the detection of the acceleration, the control unit 20 has an offset quantity setting section 33 having a table in which a plurality of offset quantity is stored. An offset quantity $\alpha$ is drived in accordance with a throttle opening degree $\phi$ from the throttle position sensor 19. The offset quantity $\alpha$, which increases with an increase of the throttle opening degree $\phi$ as shown in FIG. 3a, is applied to an acceleration threshold value calculator 34 to which the basic threshold value Nb is also fed. An acceleration threshold value NB is calculated based on $NB = Nb + \alpha$ The acceleration threshold value NB and the engine speed N are compared at a first comparing section 35. When the engine speed N is higher than the threshold value NB (N >NB), a retard control signal is fed to a primary retard angle providing section 36 to feed the predetermined initial retard angle $\theta LI$ to the output determining section 37.

In addition to the retard angles $\theta L(P)$ and $\theta LI$, the output determining section 37 is further applied with signals from the timer 29, the clutch engagement sensor 15 and the retard control signal from the second comparing section 28 for counting the number of the surge larger than the basic threshold value Nb. Namely, when the time is within the set time t after the engine is accelerated, the initial retard angle $\theta LI$ is fed to a retard angle correcting section 32 at the first surge. At the second surge, the retard angle $\theta L(P)$ is fed to the retard angle correction section 32.

In the retard angle correcting section 32, the retard angle $\theta L(P)$ or $\theta LI$ is corrected in accordance with the engine speed N, the select position of the transmission and the coolant temperature T. A corrected retard angle $\theta K$ for correcting the ignition timing $\theta IG$ is calculated as follows.

Figure 3B:
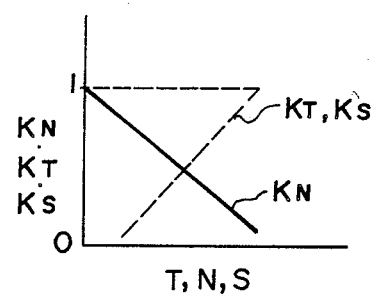
FIG. 3b if a graph showing relationships between advance angles $\theta N$, $\theta T$ and $\theta S$ and engine speed, coolant temperature and select position of a transmission of a motor vehicle.

$\theta K = \theta LI$ (or $\theta L(P)$) $\times KN \times KT \times KS$ where KN, KT and KS are correction coefficients with respect to the engine speed N, the coolant temperature T and the transmission ratio S at the select position of the transmission, respectively. As shown in FIG. 3b, the coefficient KN is a decreasing function of the engine speed N and the coefficient KT and KS are increasing functions of the coolant temperature T and the transmission ratio S, respectively. For example, when the engine speed N is high and the coolant temperature T is low and the transmission ratio S at which the select lever is positioned is small, the corrected retard angle $\theta K$ is reduced. The retard angle $\theta K$ is applied to the correcting section 24 so that the ignition timing $\theta IG$ derived from the table at the ignition timing determining section 23 is retarded ($\theta IG - \theta K$).

In operation, the air is supplied to the combustion chamber 2 of the engine 1 in dependency on the throttle position of the throttle valve 6, mixing with fuel injected by the injector 11. An ignition signal is fed from the control unit 20 to the ignition coil 17 so that the spark plug 3 is actuated through the distributor 18, thereby igniting the air-fuel mixture.

Figure 5A:
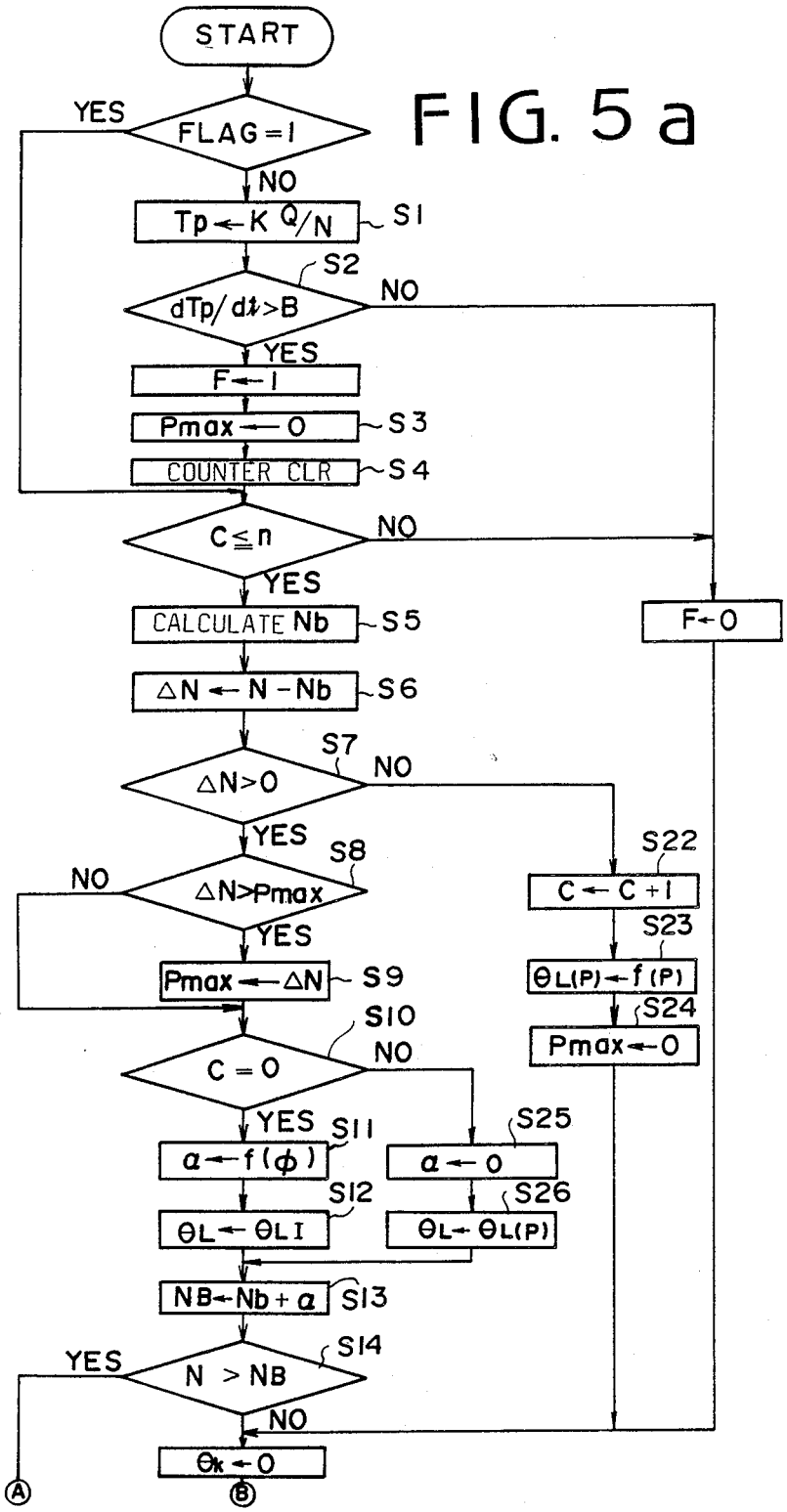
FIGS. 5a and 5b are flowcharts showing the operation of the system.
Figure 5:
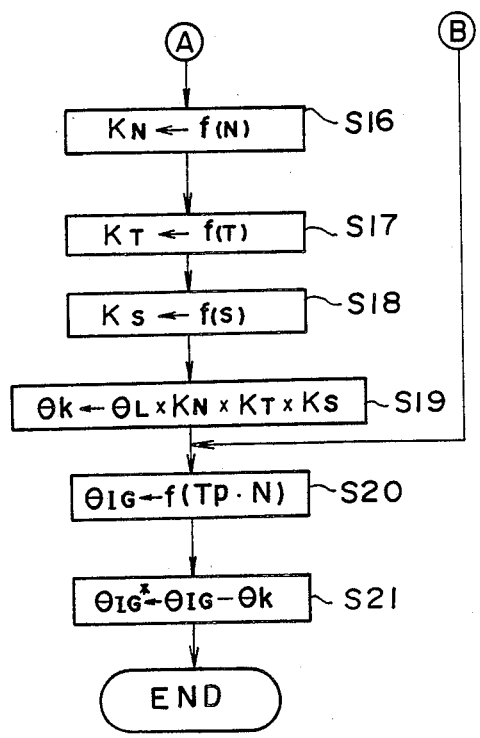

When the vehicle is at a stop or driven in a steady state, the optimum ignition timing $\theta IG$ is derived from the ignition timing determining section 23 of the control unit 20 in accordance with the basic injection pulse width Tp and the engine speed N, both representing driving conditions (step Sl of FIG. 5). Thus, the ignition timing is electorically controlled thereby effectively increasing the engine power.

The operation of the present invention when the vehicle is accelerated is described hereinafter. When the vehicle is accelerated, a large quantity of fuel as well as air is induced into the combustion chamber 2. As a result, the ignition timing $\theta IG$ is set so as to rapidly increase the engine speed N and the engine power. At the beginning of the acceleration, the engine speed N increases with fluctuating as shown in FIG. 4a. When the acceleration determining section 26 determines the acceleration (S2) (at to In FIG. 4), the timer 29 sets the time t, peak value Pmax of the engine speed N at the last surge is cleared (S3), and a counter (not shown) is cleared (S4). At the same time, the basic threshold value Nb which is substantially an average of the surges of the engine speed N is calculated by the calculator 27 (S5). At the comparing section 28, the engine speed N is compared with the basic threshold value Nb (S6). When the engine speed becomes larger than the basic threshold value Nb (S7), the retard control signal is fed to output determining section 37 and further the peak value Pmax of the current surge is detected (S8, S9).

When the first surge I (FIG. 4a) of the engine speed N is decided based on the value of the counter (S10), the throttle valve opening degree $\phi$, which represents the intention of the driver to accelerate, is fed to the offset quantity setting section 33 from which an offset quantity $\alpha$ is derived in accordance with the throttle opening degree $\phi$(S11). Then, the initial retard angle $\theta$LI is fed to the output determining section 37 (S12). The acceleration threshold value NB is calculated by adding the offset quantity $\alpha$ to the basic threshold value Nb in the acceleration threshold value calculator 34 (S13).

Next, the comparing section 35 compares the engine speed N with the acceleration threshold value NB (S14). If $N \leq NB$ (between $t_0$ and $t_1$ in FIG. 4), the retard angle $\theta$K determined as zero (S15), so that the ignition timing $\theta$IG determined at the section 23 (S20) is outputted to the ignition coil 17 through the driver 25 without being corrected (S21). If $N > NB$ (between $t_1$ and $t_2$ in FIG. 4), the initial retard angle $\theta$LI is corrected with the correction coefficients KN, KT and KS (S16, S17, S18 S19) and corrected initial retard angle $\theta$K is fed to the ignition timing correcting section 24 where the ignition timing $\theta$IG is corrected with the corrected initial retard angle $\theta$K (S20, S21). Since the acceleration threshold value NB is larger than the basic threshold value Nb, the unnecessary retard is avoided to improve the acceleration characteristics at beginning of the acceleration. On the other hand, when the engine speed N is lowered below the basic threshold value Nb (S7), the counter counts up 1 (S22) and the peak value Pmax of the first surge I (FIG. 4a) is fed to the retard angle determining section 31 where the retard angle $\theta$L(P) is derived in accordance with the peak value Pmax. The retard angle $\theta$L(P) is applied to the retard control section 30 and stored in a memory for the next control operation at the second surge II (S23). Then, the peak value Pmax is cleared (S24). When the engine speed N decreases to the threshold Nb, the application of the retard angle $\theta$LI stops.

When the second surge II increases more than the threshold Nb, the comparing section 28 applies the retard control signal to the retard control section 30. The retard angle $\theta$L(P) determined in accordance with the peak value Pmax and stored at the first surge I is fed to the output determining section 37.

During the engine speed N is large in comparison to the basic threshold value Nb, the ignition timing $\theta$IG is retarded by the corrected retard angle $\theta$K in the same manner as the period of the first surge I (S10, S25, S26, S13, S14, S16–S21).

The peak value Pmax of the second surge II is stored for next decision of the retard angle $\theta$L(P) at next surge. After the second surge II, the retard angle $\theta$L(P) decreases as the surge of engine speed N decreases as shown in FIG. 4b.

The retard angle $\theta$L($\theta$LI or $\theta$L(P)) is corrected at the retard angle correcting section 32 in dependency on the engine speed N, transmission ratio S and coolant temperature T. For example, when the coolant temperature T is low, the corrected retard angle $\theta$K is decreased by the coefficient KT so that combustion of fuel is improved. In a small transmission ratio range, where the engine speed N is high, the retard angle $\theta$K is also decreased so that unnecessary retard is avoided. In a large transmission ratio range where coolant temperature T is high and engine speed N is low, the corrected retard angle $\theta$K is substantially equal to the retard angle $\theta$L ($\theta$K $\approx$ $\theta$L).

The ignition timing $\theta$IG is consequently retarded with the angle which corresponds to the increase of the engine speed N above the average thereof to decrease the surge. When the engine speed becomes lower than the threshold NB or Nb, the output determining section 37 stops feeding the retard angle $\theta$L(P), thereby increasing the engine speed N. If the surge of the engine speed becomes smaller, the retard angle $\theta$L(P) decreases, thereby improving acceleration characteristics.

When the engine speed N converges to the threshold Nb or the set time t passes, the retard angle $\theta$L(P) is not applied so that the ignition timing $\theta$IG is recovered to increase engine power.

In accordance with the present invention, at the first surge of the engine speed after the acceleration, the ignition timing is retarded in accordance with a level of the acceleration desired by the driver while improving the acceleration characteristics and feeling by avoiding the unnecessary retard. At the later surges, the retard angle is determined in accordance with the magnitude of the surge, thereby quickly resuming the acceleration. Thus, the surges caused by the fluctuation of the engine speed can be prevented while maintaining the loss of engine power minimum.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An ignition timing control system for an automotive engine of a motor vehicle having engine speed detector means for detecting engine speed and a throttle position sensor for detecting opening degree of a throttle valve of the engine, the system comprising:
   acceleration detector means for detecting beginning of acceleration of the engine and for producing an acceleration signal;
   basic threshold value calculator means for calculating a basic threshold value in accordance with the engine speed detected by the engine speed detector means;
   acceleration threshold value calculator means for calculating an acceleration threshold value which is higher than the basic threshold value;
   comparator means for comparing surges existing in fluctuation of the detected engine speed with the basic threshold value and the acceleration threshold value;
   primary retard control means for retarding ignition timing by a predetermined initial retard angle when a first surge after the acceleration signal is higher than the acceleration threshold value; and
   secondary retard control means for retarding the ignition timing by a secondary retard angle when each of second and subsequent surges is higher than the basic threshold value.

2. The system according to claim 1, wherein the basic threshold is average of the surges.

3. The system according to claim 1, wherein the secondary retard angle is dependent on the magnitude of the last surge.

4. The system according to claim 1, wherein the difference between the acceleration threshold and the basic threshold is determined by the detected opening degree of the throttle valve.

5. The system according to claim 1, further comprising correction means for correcting the initial retard angle in accordance with engine operating conditions during the first surge is higher than the acceleration threshold value and for further correcting the secondary retard angle in accordance with the engine operating conditions during each of said second and subsequent surges is higher than the basic threshold value.

6. The system according to claim 5, wherein the engine operation conditions represent the engine speed and a coolant temperature.

* * * * *